Patented Dec. 8, 1931

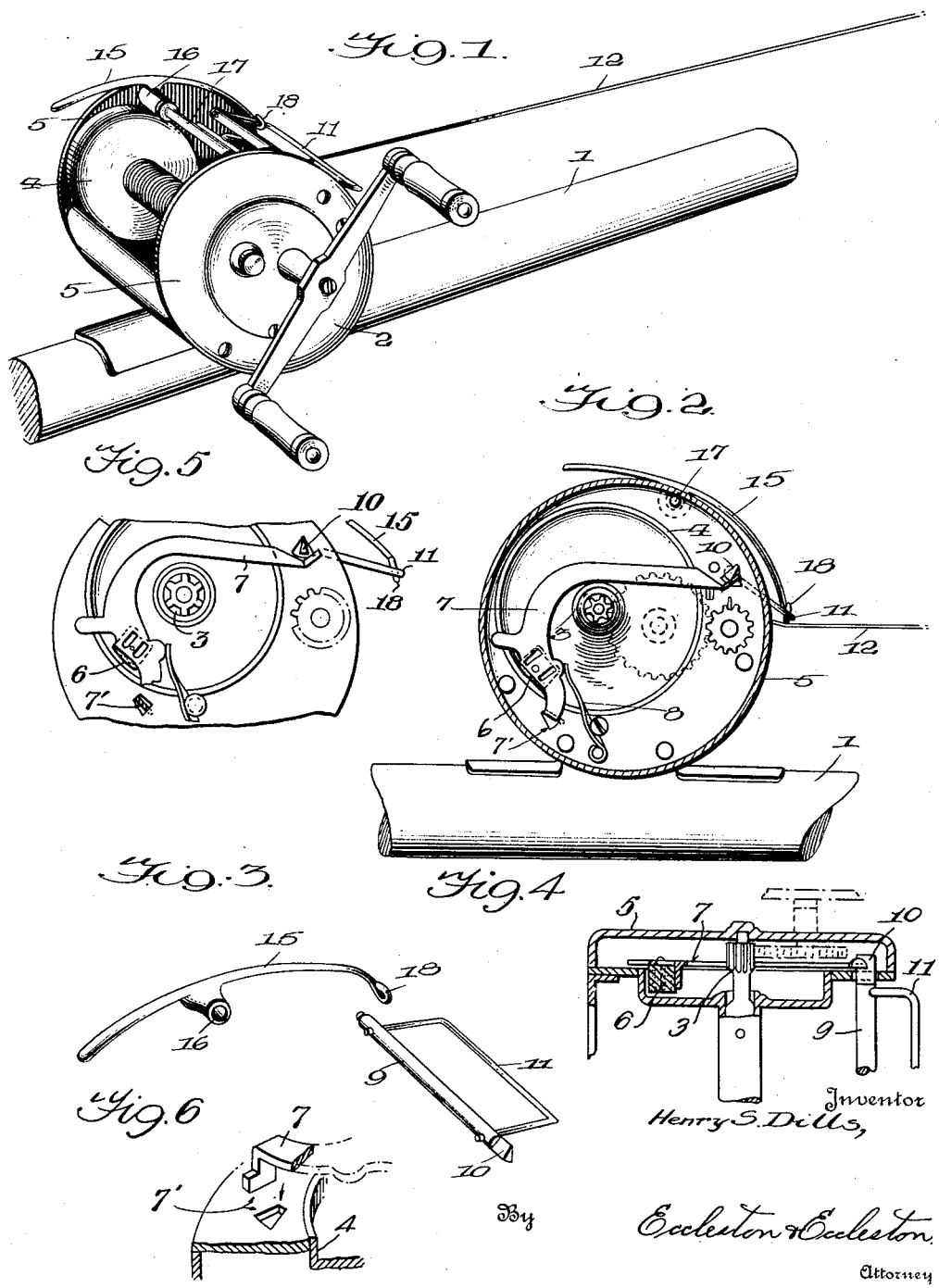

1,835,384

UNITED STATES PATENT OFFICE

HENRY S. DILLS, OF GARRETT, INDIANA; SAM F. DAVENPORT, EXECUTOR OF SAID HENRY S. DILLS, DECEASED, ASSIGNOR, BY MESNE ASSIGNMENTS, TO CREEK CHUB BAIT COMPANY, OF GARRETT, INDIANA

FISHING REEL ATTACHMENT

Application filed July 11, 1927. Serial No. 204,859.

This invention relates to fishing reels and especially to that type provided with a brake, which is automatically released by the action of the line when making the cast and which is permitted to function when the line is slack.

In the type of reel referred to the brake is automatically applied to the drum when winding in the line unless the latter is taut and unless the reel is held in such position to cause the line to hold the brake in released position. This application of the brake while the line is being wound in is of course objectionable in that it requires more power to be applied to the crank arm. Furthermore, the fact that the brake may be applied and removed intermittently while winding in the line, depending upon the condition of the line and the position of the reel, is also objectionable.

Accordingly, it is an object of the present invention to provide a reel of the type specified in which means are provided by which the brake, which is normally controlled by the condition of the line, may be manually moved to inoperative position and held there until such time as it may be desired to release it.

Other objects and advantages of the invention will be apparent from the following description when taken in connection with the accompanying drawings; in which Figure 1 is a perspective view of the reel shown attached to a fishing rod.

Figure 2 is a vertical section through the reel.

Figure 3 is a perspective view of the manually-operated lever and the automatic brake release.

Figure 4 is a sectional view through the end of the reel in which the brake is mounted.

Figure 5 is a fragmentary end view of the reel with the plate 5 removed, the brake being released; and Figure 6 is a detailed perspective view partly broken away showing the construction of the pivot for the brake lever.

Referring to the drawings in greater detail the numeral 1 indicates any conventional type of fishing rod to which is attached the reel which is indicated generally by the numeral 2.

The reel disclosed herein is well known to the trade and is comprised essentially of a drum 3 which is provided with end discs or heads 4 and which is rotatably mounted in the end discs 5 of the frame of the reel. The reel is provided with a brake shoe 6 which may be of fiber or other suitable material and which is attached to the pivoted lever 7. This lever 7 is pivoted at 7' to the wheel casing and is normally moved about its pivot by the leaf spring 8 in a direction to apply the brake to the inner face of the disc or drum head 4. To provide for the automatic release of the brake 6 an oscillatably mounted rod 9 is mounted adjacent the end of the lever 7 and is provided with a cam face 10 for cooperation with the lever. Fixed to the rod 9 is a U-shaped wire frame 11 which serves as a means to oscillate the rod to release the brake 6.

The fishing line 12 is threaded between the rod 9 and the wire frame 11 and it will be obvious that as the bait is cast the line will be drawn taut so as to raise the frame 11 with respect to the reel thereby releasing the brake 6.

As hereinbefore stated these automatic brakes are objectionable in that they retard rewinding of the line because the line is sometimes slack and at other times taut thereby causing an intermittent operation of the brake. Furthermore, in rewinding the line it is necessary that the reel be held in a particular position to cause the line to release the brake. To obviate these difficulties I have provided a manually-operated lever 15 which is provided with a sleeve 16 by which it may be pivoted to the rod 17 of the reel frame. This lever is formed with an eye 18 on one end which encircles one arm of the U-shaped frame 11 and provides a sliding connection between the lever and frame.

In the operation of casting with the present reel the release of the brake is automatic, but when it is desired to wind in the line the brake is moved to released position by pressing the thumb on the free end of the lever 15 thereby rocking the rod 9 in its bearings and swinging the lever 7 about its pivot to move the brake 6 away from the disc 4. By thus positively releasing the brake it will be apparent that the uncertainty of the automatic release is entirely eliminated and that the rewinding of the line is thereby greatly facilitated.

While I have shown the present invention as applied to a particular type of automatic brake mechanism it is to be understood that the invention is not so limited in scope since it may obviously be readily adapted to any reel in which an automatic brake mechanism is employed.

Having fully described my invention, what I claim as new is:

1. A fishing reel including a rotatably mounted drum, a spring-pressed lever, a brake shoe mounted on said lever for cooperation with the drum, an oscillatable member responsive to certain conditions of the fishing line for automatically controlling said lever and brake, and a manually operated lever operatively connected with said member for releasing said brake.

2. A fishing reel including a rotatably mounted drum, a spring-pressed lever, a brake shoe mounted on said lever for cooperation with the drum, an oscillatable member responsive to certain conditions of the fishing line for automatically controlling said lever and brake, a manually operated lever pivoted to the reel frame, and a slidable connection between one end of said lever and said member.

3. A fishing reel including a rotatably mounted drum, a spring-pressed lever, a brake shoe on said lever for cooperation with the drum, a U-shaped frame member oscillatably mounted on said reel and adapted to be automatically operated by the fishing line, means connecting said U-shaped member with the brake lever, a manually operated lever pivoted to the reel frame and a slidable connection between one end of said lever and a leg of said U-shaped member.

HENRY S. DILLS.